US006794600B2

(12) United States Patent
Fukunaga et al.

(10) Patent No.: US 6,794,600 B2
(45) Date of Patent: Sep. 21, 2004

(54) PLASMA TORCH USED FOR HEATING MOLTEN STEEL

(75) Inventors: Shinichi Fukunaga, Kitakyushu (JP); Ryoji Nishihara, Kitakyushu (JP); Kazuhisa Tanaka, Kitakyushu (JP); Mitsuji Asano, Kitakyushu (JP); Kazunori Yasumitsu, Kitakyushu (JP); Yuji Hiramoto, Kitakyushu (JP); Hiroyuki Mitake, Futtsu (JP); Takeshi Kawachi, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/468,085

(22) PCT Filed: Feb. 14, 2002

(86) PCT No.: PCT/JP01/01271

§ 371 (c)(1),
(2), (4) Date: Aug. 16, 2003

(87) PCT Pub. No.: WO02/064290

PCT Pub. Date: Aug. 22, 2002

(65) Prior Publication Data

US 2004/0074880 A1 Apr. 22, 2004

(30) Foreign Application Priority Data

Feb. 14, 2001 (JP) ....................................... 2001-037414

(51) Int. Cl.[7] ................................................ B23K 9/00
(52) U.S. Cl. .............................. 219/121.48; 219/121.36
(58) Field of Search ........................ 219/121.11, 121.36, 219/121.48, 121.5, 121.52, 121.53

(56) References Cited

U.S. PATENT DOCUMENTS 4,958,057 A * 9/1990 Shiraishi et al. ......... 219/121.5

FOREIGN PATENT DOCUMENTS

| | | | |
|---|---|---|---|
| EP | 0510816 | 10/1992 | |
| EP | 1369191 A1 * | 12/2003 | ........... B22D/11/10 |
| JP | 07148559 | 6/1995 | |
| JP | 08118028 | 5/1996 | |
| JP | 09019771 | 1/1997 | |
| JP | 01167899 | 6/2001 | |
| JP | 01179426 | 7/2001 | |

* cited by examiner

*Primary Examiner*—Tu Ba Hoang
(74) *Attorney, Agent, or Firm*—Baker Botts LLP

(57) ABSTRACT

A plasma torch used for heating a molten steel has an outer cylinder is provided. The torch includes a double tube, the bottom of which is blocked annularly. The torch also includes a bottomed cylindrical anode electrode that is installed within the outer cylinder with a gap existing between the anode electrode and the inside of the double tube. The plasma torch is provided such that pure copper is not used as a material for the anode electrode, the material has a softening point exceeding 150° C., and the ratio of an electric conductivity D of the anode electrode 28 to an electric conductivity N of the outer cylinder satisfies the formula: $0.2 \leqq D/N < 1.0$. The plasma torch prevents the melting loss and wear of the anode electrode caused by the splashes and the heat produced in the anode electrode, suppresses generation of a side arc, shows an extended life, and stabilizes the casting operation and improves the quality of the slab.

1 Claim, 3 Drawing Sheets

PLASMA TORCH USED FOR HEATING MOLTEN STEEL

CROSS REFERENCE TO RELATED APPLICATION(S)

This application is a national stage application of PCT Application No. PCT/JP02/01271 which was filed on Feb. 14, 2002 and published on Aug. 22, 2002 as International Publication No. WO 02/064290 (the "International Application"). This application claims priority from the International Application pursuant to 35 U.S.C. §365. The present application also claims priority under 35 U.S.C. §119 from Japanese Patent Application No. 2001-037414, filed on Feb. 14, 2001, the entire disclosure of which is incorporated herein by reference.

FIELD OF THE INVENTION

The present invention relates to a plasma torch, used for heating molten steel, capable of suppressing the melting loss of the anode electrode and of extending the life thereof.

BACKGROUND INFORMATION

A slab has heretofore been conventionally produced by (i) transferring a molten steel from a ladle to a tundish, (ii) pouring the molten steel into a mold through a submerged nozzle provided in the bottom portion of the tundish, (iii) cooling the poured molten steel with the mold and a water spray through coolant water nozzles provided to a holding segment, whereby the molten steel is solidified, and (iv) withdrawing the resultant slab with pinch rolls at a given rate.

However, the molten steel transferred to the tundish most likely loses heat to the atmosphere. As a result, the temperature of the molten steel within the tundish becomes lower than a standard temperature, during casting, when the casting time is prolonged due to a large capacity of the ladle, or when the overheating temperature of the molten steel is restricted due to the steel type.

The submerged nozzle for pouring a molten steel into a mold is skulled, or separation of impurities (e.g., inclusions) is hindered due to the temperature lowering, and the quality of the slab is impaired. When the steel temperature is extremely lowered, the casting operation itself may be interrupted.

As described in Japanese Patent Publication No. 3-42195, the certain countermeasures have been taken. For example, a pair of plasma torches (each having an anode electrode and a cathode electrode) is arranged above the surface of a molten steel within a tundish, and a plasma arc is produced between the plasma torches and the molten steel to heat the molten steel with the heat thereof. Moreover, argon gas and CO gas are used as the gas for the plasma to increase the arc voltage, and the output of the plasma arc is thus increased.

Furthermore, as described in Japanese Patent Publication No. 6-344096, the anode electrode of plasma torches is arranged above the surface of a molten steel within a tundish, and an electrode constituting the cathode is immersed in the molten steel. Thus, a plasma arc is produced on the surface of the molten steel from the anode electrode to heat the molten steel.

However, as described in the methods of heating molten steels described in Japanese Publication Nos. 3-42159 and 6-344096, the tip ends of the plasma torches are worn out due to melting losses or wear, and the lives of the plasma torches are very short.

The surface of the anode electrode of the plasma torches during heating the molten steel is locally melt lost or worn out by the heat of the plasma arc or radiation heat of the molten steel and by the splashes or the like of the molten steel caused by the plasma arc, the argon gas for forming plasma, or the like.

As a result, recesses and protrusions are formed on the surface of the electrode, or the tip end of the anode electrode becomes thin, and the tip end deforms outwardly to form a so-called protruded portion (or protrusion).

When the protruded portion is formed, a plasma arc concentrates thereat to increase a heat load on the protruded portion, and the surface temperature exceeds the melting point of the electrode material.

Furthermore, because the molten steel is heated by applying a current as large as from 1,000 to 5,000 A so that a plasma arc is continuously produced on the molten steel surface, concentration of the plasma arc in the protruded portion and melting loss (e.g., wear) of the protruded portion are repeated. As a result, the melting loss (wear) drastically proceeds. The phenomenon becomes significant when DC twin-type plasma torches are employed.

In addition, when splashes of the molten steel are produced, the base metal sticks to the anode electrode and the outer cylinder. The base metal sticking thereto generates a plasma arc that is a so-called side arc in a space other than the one between the anode electrode and the molten steel surface.

In particular, when materials having melting loss resistance and wear resistance are used for the anode electrode and outer cylinder, a side arc tends to be generated depending on the electric resistance, the electric conductivity, and the like of the materials.

When a side arc is generated, the surface of the anode electrode, or the front end (outer cylinder) or the like is opened, to leak water, and the life of the anode electrode is greatly shortened.

Consequently, the heating treatment cost of the molten steel rises, and problems such as the time required for replacing the plasma torches, the deterioration of the quality of the slab caused when the heating becomes impossible and destabilization of the casting operation caused by skulling of the submerged nozzle, arise.

Exemplary embodiments of the present invention take into consideration the above-described situation. Accordingly, one of the objects of the present invention is to provide a plasma torch for heating a molten steel that prevents the melting loss and wear of an anode electrode caused by heat produced in the anode electrode and splashes, that suppresses generation of a side arc, that has a longer life, and that stabilizes the casting operation and improves the quality of the slab.

SUMMARY OF THE INVENTION

A plasma torch according to an exemplary embodiment of the present invention can be used for heating a molten steel, and may achieve the above-described object is provided. In particular, the plasma torch may be used for heating a molten steel and can have an outer cylinder. Such cylinder by be composed of a double tube the bottom of which is clogged annularly, and a bottomed cylindrical anode electrode that is installed within the outer cylinder with a gap existing between the anode electrode and the inside of the double tube. For the plasma torch, pure copper is preferably not used as the electrode material, the material has a softening point exceeding 150° C., and the ratio of an electric conductivity D of the anode electrode to an electric conductivity N of the outer cylinder satisfies the following formula:

$$0.2 \leqq D/N < 1.0.$$

Because a material having a softening point higher than that of pure copper is preferably used for the anode electrode, melting loss or wear of the tip end, and the like, caused by the heat of a plasma arc, the radiation heat and splashes of a molten steel, and the like, can be suppressed. Moreover, at approximately the same time, bulging of the anode electrode caused by cooling water pressure is suppressed so that the surface is kept substantially smooth, and melting loss caused by the concentration of a plasma arc can be prevented.

Furthermore, the softening of the surface of the anode electrode facing a molten steel may be suppressed so that the melting loss and the wear caused by splashes can be prevented and generation of a side arc caused by the electric conductivities of the anode electrode and the outer cylinder can also be prevented.

When the D/N ratio becomes less than 0.2, the electric conductivity of the outer cylinder becomes too high in comparison with that of the anode electrode, and a side arc is generated from the anode electrode to the outer cylinder.

When the D/N ratio becomes 1.0 or more, problems such as deterioration of the melting loss resistance and wear resistance caused by a decrease in the softening point of a material used for the anode electrode, or lowering of the electric conductivity of the outer cylinder arise. As a result, the operation is destabilized due to poor ignition.

In addition, the softening point of a material is a temperature at which the hardness of the material is lowered to 35% of the maximum hardness of the material when the material is heated at the temperature for 2 hours.

In order to extend the life of the anode electrode, the heat conductivity and electric conductivity of the material of the electrode has been taken into consideration, as described in Japanese Patent Application No. 2001-179246. However, a material having a high heat conductivity is preferable to improve the heat resistance in view of a material design of the anode electrode; moreover, a material having a low electric conductivity is preferred to improve the arc resistance. However, selection of a material compatibly showing heat resistance and arc resistance has been difficult in the past.

However, using a material showing low electric conductivity while maintaining heat conductivity, a long life plasma torch has been attained. As a result, the life of a plasma torch can be greatly improved in comparison with a conventional torch by restricting the ratio of an electric conductivity of the anode electrode to an electric conductivity of the outer cylinder to a specific range.

Furthermore, the flow rate of an argon gas for forming plasma supplied to the plasma torch should preferably be from 300 to 1,000 NL/min.

Because an ionized argon gas-containing argon gas flow that encloses the tip end of the electrode and that proceeds from the electrode toward the surface of a molten steel is formed between the electrode and the molten steel surface, turbulence of the plasma arc from the electrode to the molten steel surface can be removed, and generation of a side arc can be prevented.

When the flow rate of the argon gas becomes less than 300 NL/min., an ionized argon gas flow may be weakened, and an argon gas flow covering the periphery of the electrode is not formed, whereby a side arc is likely to be generated.

When the flow rate of the argon gas exceeds 1,000 NL/min., the effect of stabilizing a plasma arc usually cannot be expected, and the argon gas flow forms splashes of a molten steel to shorten the life of the electrode.

All cited references are hereby incorporated herein by reference in their entireties.

DETAILED DESCRIPTION

Exemplary embodiments of the present invention shall be described below by making reference to the attached drawings.

Figure 1:
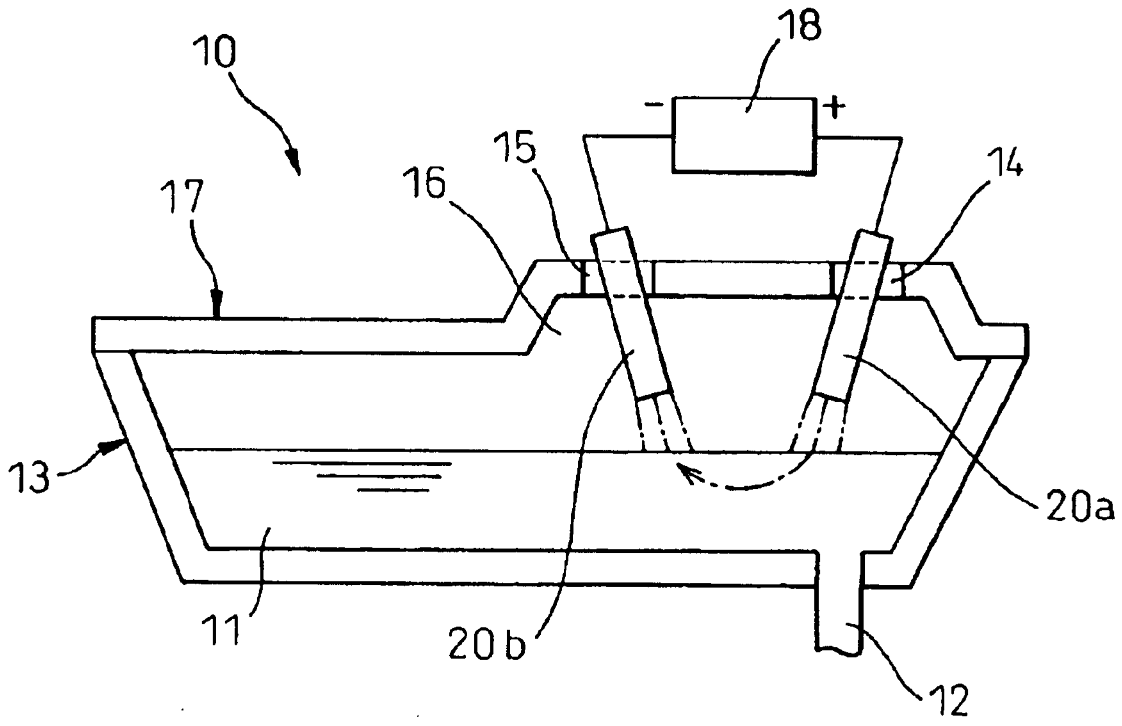
FIG. 1 shows a side view of a heating apparatus for a molten steel to which plasma torches used for heating a molten steel that are related to an exemplary embodiment of torch according to the present invention are applied.

FIG. 1 shows a heating apparatus 10 for use on a molten steel, in which plasma torches used for heating a molten steel and related to one exemplary embodiment of the present invention. The heating apparatus 10 includes a tundish 13 to which a submerged nozzle 12, for pouring a molten steel 11 into a mold (not shown in FIG. 1) that is attached in the bottom portion, a cover 17 covering the top of the tundish 13, insertion openings 14, 15, thus and forming a heating chamber 16 in the interior (within) the tundish 13. A DC type plasma torch is provided on the anode side (hereinafter referred to as anode torch) 20*a* and a DC type plasma torch is provided on the cathode side (hereinafter referred to as cathode torch) 20*b*. Both of the torches are inserted into the heating chamber 16 through the insertion openings 14, 15, respectively with a moving apparatus not shown in FIG. 1. The heating apparatus is further equipped with a DC application apparatus 18 that applies a current to the anode and cathode torches 20*a*, 20*b*.

Figure 2:
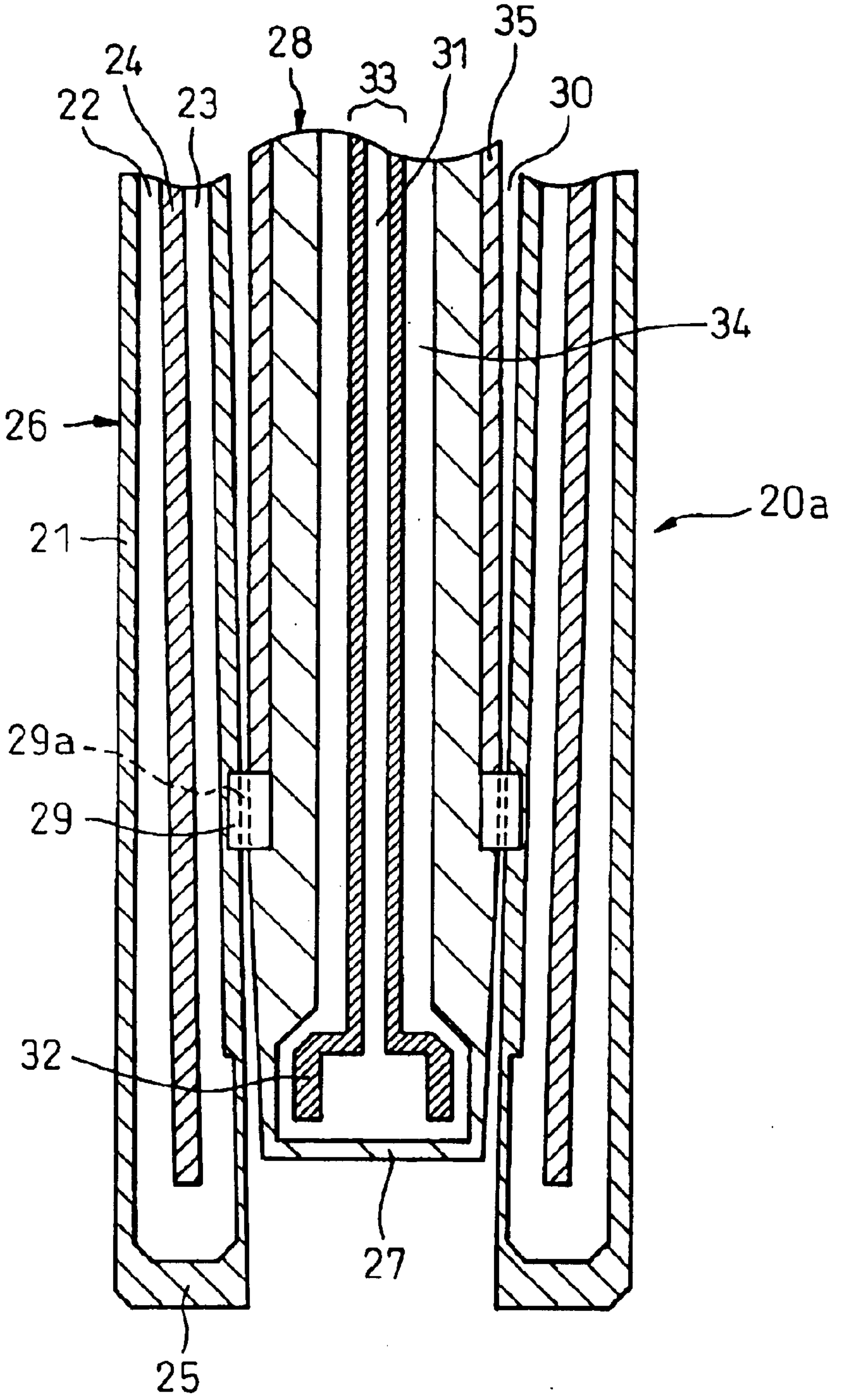
FIG. 2 shows a sectional view of a tip end portion of an exemplary embodiment of the plasma torch according to the present invention that can be used for heating the molten steel.

As shown in FIG. 2, the anode torch 20*a* is a type of plasma torch which may be used for heating a molten steel, and related to the embodiment of the present invention. Such torch 20*a* has an outer cylinder 26, whereas in the interior of double tube 21, the tip end of which is annularly blocked by a bottom portion, a coolant water divisor (coolant water separating member) 24 that forms a coolant water supply passage 22 and a coolant water discharge passage 23 is arranged. A hollow cylindrical anode electrode (hereinafter referred to as electrode) 28 the tip end of which is clogged with a baseplate 27 having a thickness from 0.5 to 5 mm.

The electrode 28 and outer cylinder 26 are each preferably formed from a material such as a Cu alloy (Cu being excluded) containing at least one of Cr, Ni, Zr, Co, Be, Ag, etc., and a W alloy containing at least one of Cu, Cr, Ni, Zr, Co, Be, Ag, etc., or W.

A hollow cylinder type (annular) insulating block 29 composed of a material such as a polyvinyl chloride or Teflon and having vent holes 29*a* is fitted between the outer cylinder 26, namely, the inner wall of the double tube 21 and the periphery of the electrode 28, and the insulating block 29 is used as a spacer to form an argon gas supply passage 30.

Furthermore, in the interior of the electrode 28, a cylindrical coolant water divisor (coolant water separating member) 33 having a water supply passage 31 in the center and a spread portion 32 at the tip end is provided. A gap of from 0.5 to 3 mm is provided between the tip end of the coolant water divisor 33 and the baseplate 27 of the electrode 28. Moreover, a water discharge passage 34 communicating with the gap of the baseplate 27 is formed between the coolant water divisor 33 and the inner wall of the electrode 28.

Furthermore, a cylindrical insulating body 35 composed of a material such as a polyvinyl chloride or a reinforced plastic is fitted in the upper peripheral portion of the electrode 28 to prevent a short-circuit 25 between the electrode 28 and the outer cylinder 26 when a current is applied to the electrode 28.

In addition, the cathode torch 20*b* has the same structure as that of the anode torch 20*a* explained above except that it is equipped with a cathode electrode in place of the anode electrode 28 (not shown in FIG. 2 for the sake of simplicity).

Further, the movement of the exemplary heating apparatus 10 to which plasma torches used for heating the molten steel is described below.

For example, during pouring the molten steel 11 transferred to the tundish 13 into a mold through the submerged nozzle 12, the temperature of the molten steel 11 usually lowers at a rate of from 0.1 to 0.5° C./min. due to heat radiation when the remaining amount of the molten steel 11 within the tundish 13 becomes small, or the pouring time is prolonged.

In order to prevent a temperature decrease of the molten steel 11, the moving apparatus is actuated so that the anode torch 20*a* and the cathode torch 20*b* are inserted into the heating chamber 16 through the insertion openings 14, 15, respectively, provided in the cover 17. Moreover, the anode torch 20*a* and the cathode torch 20*b* are lowered and held so that the tip ends of the anode torch 20*a* and the cathode torch 20*b* are positioned above the molten steel 11 with a space of from 100 to 500 mm.

As shown in FIG. 2, coolant water can be supplied to the water supply passage 22 formed by the coolant water divisor 24 provided within the double tube 21 at a rate of 200 NL/min. to cool the anode torch 20*a* and the cathode torch 20*b*. The coolant water supplied to the water supply passage 22 cools the bottom portion 25 of the outer cylinder 26, passes along the water discharge passage 23 to cool the inner side wall of the outer cylinder 26, and is discharged.

Furthermore, coolant water is preferably supplied, at a rate of 120 NL/min., to the water supply passage 31 provided in the center of the cylindrical electrode 28. When the coolant water is allowed to flow into the water discharge passage 34 along the coolant water divisor 33, the baseplate 27 and peripheral portion of the electrode 28 are cooled to prevent a temperature rise of the tip end portion, the body, and the like.

At approximately the same time, an argon gas may be supplied, at a rate from 300 to 1,000 NL/min., to the supply passage 30 formed between the electrode 28 and the outer cylinder 26 through the vent holes 29*a* of the insulating block 29. The argon gas encloses the surrounding of the electrode 28, forms an argon gas flow proceeding toward the molten steel 11, replaces the atmosphere with the argon gas, and is utilized as a gas for forming plasma.

Moreover, a current from 1,000 to 5,000 A is applied to the anode torch 20*a* with the DC application apparatus 18, whereby a plasma arc is directly formed toward the molten steel 11 from the baseplate 27 of the electrode 28 in the anode torch 20*a*. Further, as shown with an arrow in FIG. 1, a current also flows into the cathode torch 20*b*, and a plasma arc is also formed between the surface of the molten steel 11 and the cathode torch 20*b*. As a result, the molten steel 11 is heated with a plasma arc heat, an electric resistance heat, a radiation heat of these, and the like.

During heating the molten steel, a plasma arc concentrates on the center of the surface of the baseplate 27 in the electrode 28 by the heat of the plasma arc and radiation heat of the molten steel 11, and by the thermal pinch action of the argon gas for sealing, and splashes of the molten steel 11 are generated by the plasma arc and the argon gas flow. As a result, the surface of the baseplate 27 of the electrode 28 suffers a harsh load.

However, the electrode 28 and the baseplate 27 are each formed from such materials that exclude a material having a softening point of 150° C. or less (such as pure copper or oxygen free copper) and which has a softening point exceeding 150° C. as a Cu alloy containing at least one of Cr, Ni, Zr, Co, Be, Ag, etc., a W alloy containing at least one of Cu, Cr, Ni, Zr, Co, Be, Ag, etc., or W. The electrode 28 and the baseplate 27 therefore show an increased heat resistance, and can manifest resistance to melting loss caused by the heat of the plasma arc and the radiation heat of the molten steel 11 and resistance to wear caused by splashes, and the like. Moreover, a formation of a protruded portion on the baseplate 27 produced by the radiation heat, the concentration of the plasma arc, the water pressure of the coolant water and the like can be suppressed.

Furthermore, the surface of the baseplate 27 of the electrode 28 is preferably maintained substantially smooth, and a drastic melting loss caused by formation of a local protrusion of the surface of the baseplate 27 can be prevented.

In addition, examples of the Cu alloy include a Cu—Cr alloy, a Cu—Cr—Zr alloy, a Cu—Zr alloy, a Cu—Be—Co alloy, a Cu—Ni alloy and a Cu—Ag alloy. Examples of the W alloy may include a W—Cu alloy, and an alloy obtained by adding at least one of Cr, Ni, Zr, Co, Be and Ag to a W—Cu alloy. Moreover, W alone can also be used.

When the material used for the electrode 28 is replaced with a material merely having a high softening point, a side arc is generated due to an electric conductivity difference between the electrode material and the outer cylinder material, and destabilization of a plasma arc, such as poor ignition, is incurred.

In order to prevent such side arc generation and poor ignition, and the like, materials are selected to satisfy the formula:

$$0.2 \leq D/N < 1.0$$

wherein D is an electric conductivity of the material of the electrode 28, and N is an electric conductivity of the material of the outer cylinder 26.

The D/N ratio can be used for following reasons. When an electric conductivity in terms of Siemens/meter (S/m) that is commonly used as an index of the electric conductivity of the electrode and outer cylinder is used, side arcs generated in the plasma torches and poor ignition thereof, melting loss and wear produced in the electrode and outer cylinder, and the like can be accurately determined.

When the electric conductivity D of the material of the electrode 28 and the electric conductivity N of the material of the outer cylinder 26 are in a predetermined range, generation of side arcs caused by the electric conductivities is stably suppressed, and melting loss resistance is manifested, whereby the lives of the plasma torches 20*a*, 20*b* can be extended. Moreover, poor ignition in which a plasma arc proceedes from the electrode 28 toward the surface of the molten steel 11, destabilization of a plasma arc, and the like, can be prevented, and heating and casting operations can be stably conducted.

In particular, when the materials are selected so that the lower limit value of a D/N ratio becomes 0.32, a difference between the electric conductivity of the electrode 28 and that of the outer cylinder 26 can be made small, and generation of side arcs caused by the electric conductivities can be drastically reduced to give preferred results.

Furthermore, an argon gas is supplied at a rate from 300 to 1,000 NL/min. from the base end of the supply passage 30. The supply of an argon gas generally provides the following results. The argon gas encloses the surrounding of the electrode 28, and can form a sufficient flow proceeding toward the surface of the molten steel 11. The argon gas flow therefore cools the periphery of the anode torch 20*a*, and the flow increases the effect of shielding the surrounding. As a result, part of the argon gas is ionized, and a plasma arc proceeding from the electrode 28 toward the molten steel 11 is introduced. A good plasma arc can thus be formed between the surface of the electrode 28 and the molten steel 11. As a result, promotion of the ionization of the argon gas increases the effect of suppressing the turbulence of the plasma arc, and the plasma arc can be stabilized.

Furthermore, suppression of the turbulence of the plasma arc can more surely prevent side arcs short-circuiting the electrode 28 and a portion other than the surface of the molten steel 11 such as the bottom portion 25 of the outer cylinder 26.

Moreover, similarly to the electrode 28, the outer cylinder 26 is preferably formed from materials from which a material having a softening point of 150° C. or less (such as pure copper or oxygen free copper) is excluded and which have a softening point exceeding 150° C. as a Cu alloy containing at least one of Cr, Ni, Zr, Co, Be, Ag, etc., a W alloy containing at least one of Cu, Cr, Ni, Zr, Co, Be, Ag, etc., or W.

Furthermore, the heat resisting strength of the outer cylinder 26 is then increased, and the melting loss and wear of the outer cylinder 26 and the bottom portion thereof produced by the heat of the plasma arc and the radiation heat of the molten steel 11, and the splashes of the molten steel 11 formed by the plasma arc and argon gas flow can be prevented.

The plasma arc can thus be stably formed. The molten steel 11 stored within the tundish 13 can be heated by the heat of the plasma arc, the heat caused by the electric resistance and/or the radiation heat of these heat so that temperature lowering of the molten steel is prevented. As a result, skulling of the submerged nozzle 12 for pouring the molten steel 11 into a mold is suppressed, and separation of impurities (inclusions) is promoted. As a result, the quality of the slab can be improved, and the casting operation can be stabilized.

EXAMPLE

Plasma torches used for heating molten steels and related to one embodiment of the present invention is explained herein.

A molten steel in an amount of 40 tons was transferred from a ladle to a tundish, and a temperature decrease in 10° C. of the molten steel was anticipated when the amount of a remaining molten steel in the tundish became 20 ton during pouring the molten steel into a mold through a submerged nozzle. Accordingly, an anode torch and a cathode torch each having an electrode and an outer cylinder, that were composed of two materials differing from each other in electric conductivity, were inserted through insertion openings provided in the cover of the tundish, and lowered and held so that both tip ends occupied positions 300 mm above the molten steel surface.

Plasma arcs were generated with a current of 3,000 A at 200 V by varying a flow rate of an argon gas supplied to a supply passage formed between each electrode and the corresponding outer cylinder of the anode torch and the cathode torch to raise the molten steel temperature by 10° C.

Figure 3:
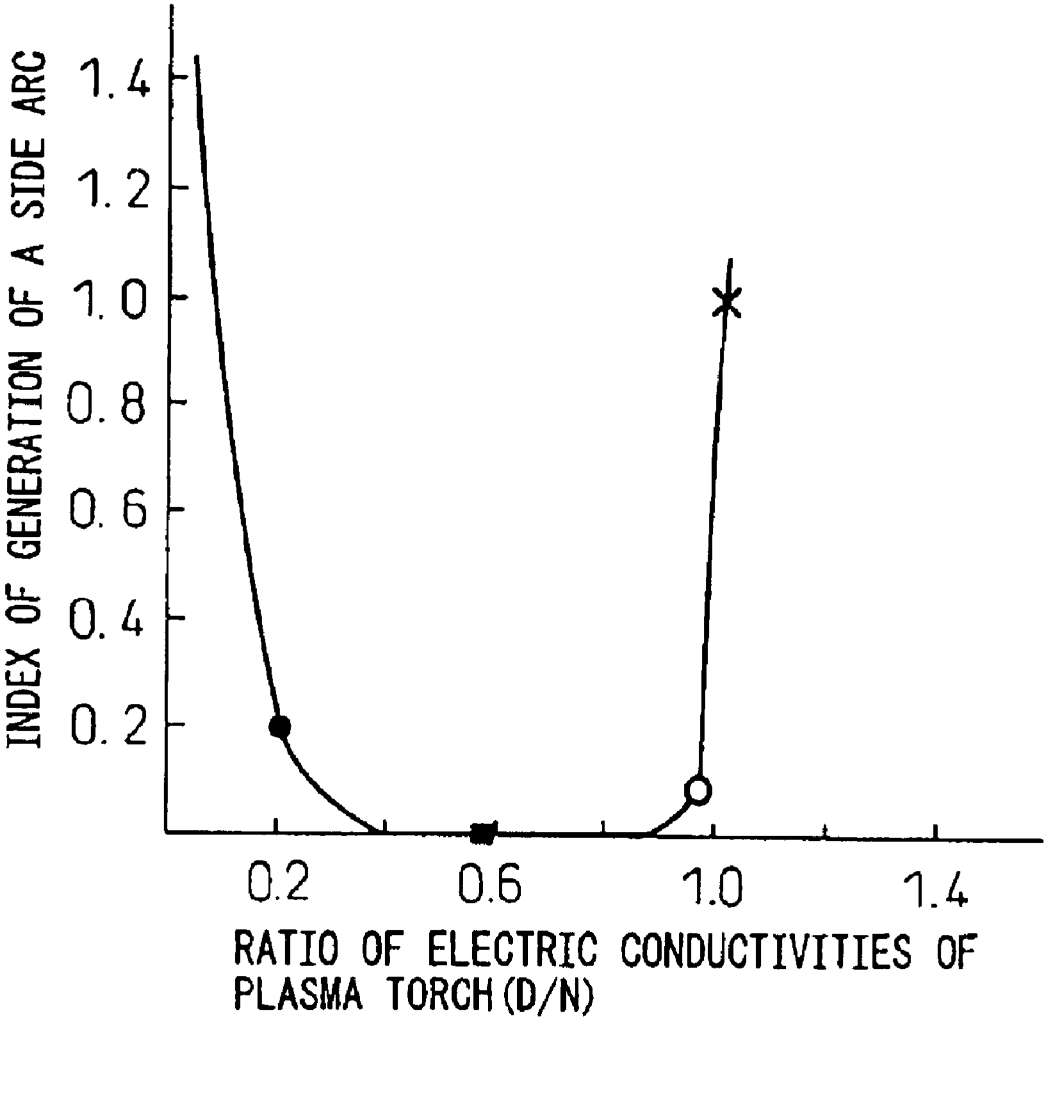
FIG. 3 shows a graph showing the relationship between a ratio of electric conductivities and an index of generation of a side arc.

In addition, as a comparative example, a molten steel was heated under substantially the same conditions while the following torch was used (designated by X): the outer cylinder made of W; the electrode made of an alloy composed of 75% by mass of WC (tungsten carbide) and 25% by mass of Cu; and the ratio of an electric conductivity D of the electrode to an electric conductivity N of the outer cylinder being 1. The index of generation of a side arc in the anode torch then became 1. FIG. 3 shows the results.

In the case of using the torch under the following conditions (designated by ●): the electrode made of an alloy composed of 70% by mass of WC (tungsten carbide) and 30% by mass of Cu; the outer cylinder made of an alloy composed of 97% by mass of Cu and 3% by mass of W; the ratio of an electric conductivity D of the electrode to an electric conductivity N of the outer cylinder being 0.22; and an argon gas for forming plasma supplied at a rate of 300 NL/min., the index of generation of a side arc then became 0.20.

Moreover, in the case of using the torch under the following conditions (designated by ■): the electrode made of W; the outer cylinder made of an alloy composed of 98.8% by mass of Cu, 1% by mass of Ni and 0.20% by mass of P (phosphorus); the ratio of an electric conductivity D of the electrode to an electric conductivity N of the outer cylinder being 0.589; and an argon gas for forming plasma being supplied at a rate of 300 NL/min., the index of generation of a side arc then became 0.

Furthermore, in the case of using the torch under the following conditions (designated by ○): the electrode made of an alloy composed of 23% by mass of Cu and 78% by mass of W; the outer cylinder made of an alloy composed of 25% by mass of Cu and 75% by mass of W; the ratio of an electric conductivity D of the electrode to an electric conductivity N of the outer cylinder being 0.94; and an argon gas for forming plasma supplied at a rate of 600 NL/min., the index of generation of a side arc then became 0.1.

Moreover, when the ratio of an electric conductivity D of the electrode to an electric conductivity N of the outer cylinder satisfied the range of an exemplary embodiment according to the present invention, the plasma torch could showed good melt loss resistance and wear resistance, and an extended life.

However, both in the case of using the torch having an outer cylinder made of W and an electrode that was made of an alloy composed of 75% by mass of WC (tungsten carbide) and 25% by mass of Cu and showing the ratio of an electric conductivity D of the electrode to an electric conductivity N of the outer cylinder of 1.0, and in the case of increasing the flow rate of a supplied argon gas to 800 NL/min. or 1,000 NL/min. while the other heating conditions were made the same, the generation index of a side arc became 1, and the torch showed a greatly shortened life.

Furthermore, in the case of the ratio of an electric conductivity D of the electrode to an electric conductivity N of the outer cylinder being less than 0.2, and increasing the flow rate of a supplied argon gas to 800 NL/min. or 1,000 NL/min., the generation index of a side arc became 1.4, and poor results were obtained.

In addition, Table 1 shows the electric conductivities and properties of typical anode electrode materials.

TABLE 1

| | Instance 1 | | Instance 2 | | Instance 3 | |
|---|---|---|---|---|---|---|
| Electrode material | Material 1 W | Material 2 Cu | Material 1 W | Material 2 Cu | Material 1 W | Material 2 Cu |
| Mass ratio of materials (%) | 70 | 30 | 80 | 20 | 70 | 30 |
| Electric conductivity (S/m) | 17 | | 16 | | 12 | |
| Properties | Excellent in heat conductivity and arc resistance | | | | Arc resistance was increased while heat conductivity was maintained, in comparison with Instances 1, 2. | |

Although exemplary embodiments of the present invention have been explained herein above, the present invention is in no way restricted thereto. Alteration of the conditions of the invention is still in the scope of the invention as long as the alteration does not deviate from the subject matter of the invention.

For example, a metal other than pure copper or an alloy that has a softening point exceeding 150° C. and electric conductivity can be used as the electrode material of the anode torch. Moreover, another metal or alloy having a softening point exceeding 150° C., and melting loss resistance and wear resistance can be used as the outer cylinder material.

Furthermore, a gas other than an argon gas, such as a nitrogen gas, a helium gas and a neon gas can be used as a plasma-forming gas that is used for the plasma torch. Moreover, a mixture of an argon gas and other gases can also be used.

INDUSTRIAL APPLICABILITY

The plasma torch used for heating a molten steel in the present invention has an outer cylinder composed of a double tube the bottom of which is blocked annularly, and a bottomed cylindrical anode electrode that is installed within the outer cylinder with a gap existing between the anode electrode and the inside of the double tube, and is characterized in that pure copper is not used as the electrode material, the material has a softening point exceeding 150° C., and the ratio of an electric conductivity D of the anode electrode to an electric conductivity N of the outer cylinder is in a given range (0.2 to 1.0). Accordingly, the melting loss, wear and the like of the tip end of the electrode caused by radiation heat of the plasma arc and molten steel, splashes and the like can be suppressed.

Further, the use of the plasma torch suppresses the bulging of the anode electrode caused by the pressure of coolant water or the like to keep the anode electrode surface smooth, prevents the melting loss of the anode electrode caused by concentration of the plasma arc, can extend the life of the anode torch due to prevention of the formation of a side arc, and can stabilize the casting operation and improve the slab quality.

In addition, when the argon gas for forming plasma is supplied at a rate from 300 to 1,000 NL/min. to the plasma torch used for heating a molten steel in the present invention, turbulence of a plasma arc proceeding from the electrode toward the molten steel surface is removed, and short-circuiting between the electrode and the outer cylinder is suppressed to prevent a side arc and to greatly extend the life of the plasma torch. Moreover, ionization of the argon gas is promoted to stabilize the plasma arc, and can increase the heating effect.

What is claimed is:

1. A plasma torch configured for heating a molten steel, comprising:

an outer cylinder including a double tube which has a bottom portion, the bottom portion being annularly blocked; and a bottom cylindrical anode electrode disposed within the outer cylinder such that a gap is provided between the anode electrode and an internal section of the double tube, wherein the anode electrode is composed of a material which excludes pure copper, wherein the material has a softening point that exceeds 150° C., and wherein the ratio of an electric conductivity ("D") of the anode electrode to an electric conductivity ("N") of the outer cylinder is provided according the following formula:

$$0.2 \leq D/N \leq 1.0.$$

* * * * *